US010411306B2

(12) United States Patent
Kim et al.

(10) Patent No.: US 10,411,306 B2
(45) Date of Patent: Sep. 10, 2019

(54) BATTERY MODULE WITH INTEGRATED RF COMMUNICATION AND CELL SENSING BOARD

(71) Applicant: GM GLOBAL TECHNOLOGY OPERATIONS LLC, Detroit, MI (US)

(72) Inventors: Theodore T. Kim, Rochester Hills, MI (US); Jeffrey Johnson, Clarkston, MI (US); Tao Wang, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 395 days.

(21) Appl. No.: 15/254,662

(22) Filed: Sep. 1, 2016

(65) Prior Publication Data

US 2017/0301961 A1    Oct. 19, 2017

Related U.S. Application Data

(60) Provisional application No. 62/324,509, filed on Apr. 19, 2016.

(51) Int. Cl.
*H01M 10/42* (2006.01)
*H01M 10/48* (2006.01)
(Continued)

(52) U.S. Cl.
CPC .......... *H01M 10/425* (2013.01); *B60L 58/12* (2019.02); *H01M 2/1077* (2013.01);
(Continued)

(58) Field of Classification Search
CPC .. H01M 10/425; H01M 10/482; H01M 2/206; H01M 2010/4271;
(Continued)

(56) References Cited

U.S. PATENT DOCUMENTS 6,184,656 B1 * 2/2001 Karunasiri ............ B60L 3/0046
180/65.8
2009/0303138 A1 * 12/2009 Lin .......................... H01Q 1/44
343/702

(Continued)

FOREIGN PATENT DOCUMENTS

CN           1284033 A      2/2001

OTHER PUBLICATIONS

Ross Yu, Mesh Network Protocols for the Industrial Internet of Things, Microwave Journal, Milpitas, California.

*Primary Examiner* — Anthony R Jimenez
(74) *Attorney, Agent, or Firm* — Quinn IP Law

(57) ABSTRACT

A battery module for use with a controller includes a printed circuit board assembly (PCBA) mounted to a plurality of battery cells. The PCBA includes a substrate, a radio frequency (RF) communications circuit, a cell sensing circuit, and a conductive interconnecting member. The cell sensing circuit is operable for measuring a respective cell voltage of each of the battery cells. The conductive interconnect member forms an electrical connection between the battery cells. The RF communications circuit is in wireless communication with the controller and is operable for wirelessly transmitting the measured cell voltages to the controller. A battery system includes a master battery controller and the battery pack. A vehicle includes an electric machine operable for generating output torque for propelling the vehicle, as well as the battery system noted above.

19 Claims, 4 Drawing Sheets

(51) Int. Cl.
  *H04B 1/48*   (2006.01)
  *H01M 2/10*   (2006.01)
  *B60L 58/12*  (2019.01)
  *H01M 2/20*   (2006.01)

(52) U.S. Cl.
  CPC ............ *H01M 10/482* (2013.01); *H04B 1/48* (2013.01); *H01M 2/206* (2013.01); *H01M 2010/4271* (2013.01); *H01M 2010/4278* (2013.01); *H01M 2220/20* (2013.01)

(58) Field of Classification Search
  CPC ...... H01M 2010/4278; H01M 2220/20; B60L 11/1861; H02K 7/006; H04B 1/48
  USPC .......................................................... 429/61
  See application file for complete search history.

(56) References Cited

U.S. PATENT DOCUMENTS

| | | |
|---|---|---|
| 2014/0302352 A1 | 10/2014 | Lenz et al. |
| 2015/0303434 A1 | 10/2015 | Holtappels et al. |

* cited by examiner

BATTERY MODULE WITH INTEGRATED RF COMMUNICATION AND CELL SENSING BOARD

CROSS-REFERENCE TO RELATED APPLICATIONS

This application claims the benefit of U.S. Provisional Application No. 62/324,509, filed Apr. 19, 2016, which is hereby incorporated by reference in its entirety.

TECHNICAL FIELD

The present disclosure relates to a battery module with an integrated RF communication and cell sensing board.

BACKGROUND

Electrochemical battery packs are used to energize electric machines in a variety of systems. For instance, motor output torque from a rotor shaft of an electric machine in the form of a traction motor or motor/generator unit may be transmitted to an input member of a transmission. The motor output torque in such a configuration may be used to perform useful work as part of a mobile or stationary power plant or other torque-generating system. The electric machine may be an alternating current (AC) or direct current (DC) device that draws electrical energy from or delivers electrical energy to the various cells of the battery pack as needed. In turn, the battery pack may be recharged via a charging current supplied from an offboard power supply or onboard regeneration. The battery cells store an electric charge until needed, while a reverse reaction discharges the battery cells to deliver electricity to the windings of the electric machine. The charging and discharging currents, as well as the individual cell voltages, are closely monitored and regulated by a master battery control module so as to optimize overall system performance.

Battery packs, particularly those used as a DC power supply in a hybrid electric or battery electric vehicle, may have a modular design. That is, a predetermined number of battery cells may be stacked together within an outer cage, with multiple modular housings serially connected to form a battery pack of a desired size. The battery cells may be interconnected via a flexible or rigid interconnect member and enclosed using a module cover or other suitable enclosure in order to protect the battery cells from moisture, dirt, and other debris.

In some configurations, each battery pack may have a resident master controller referred to as a battery system manager (BSM). The BSM is typically directly mounted to the battery pack. Each battery module includes a dedicated cell sensing board (CSB) in the form of an integrated circuit. The CSB is configured to read the individual battery cell voltages for a given battery module and report the cell voltages to the BSM as part of the overall battery control strategy. The various CSBs are typically connected in a daisy-chain manner to the resident BSM via cables, harnesses, and other physical connectors to provide the requisite communications and electrical connectivity.

SUMMARY

Disclosed herein are a battery module, a battery pack having a plurality of the battery modules, and a vehicle using such a battery pack, as well as a method for controlling the battery pack. By way of example and not limitation, the battery module may be used with a master battery controller such as the BSM noted above. Each battery module includes battery cells and an integrated printed circuit board assembly (PCBA). The PCBA, which is mounted with respect to and electrically connected to the battery cells, includes a substrate, a radio frequency (RF) communications circuit, a cell sensing circuit integrated with the RF communications circuit, and an electrically conductive interconnect member.

The RF communications circuit and the cell sensing circuit may be connected to each other through the substrate, e.g., via surface or subsurface traces thereof, with the cell sensing circuit operable for measuring a respective cell voltage of each of the battery cells used in the battery module. The conductive interconnect member forms a series electrical connection between the various battery cells. The RF communications circuit, which is in wireless communication with the controller, is operable for wirelessly transmitting the cell voltages to the controller for use in the overall control of a battery pack containing the battery module.

The substrate of the PCBA may be optionally embodied as a flexible circuit board or "flex circuit". The conductive interconnect member, which is an integral part of the PCBA in such an embodiment, may include multiple flat conductive tabs oriented in a direction that is parallel to a plane of alignment of the substrate. Alternatively, the substrate may be constructed of rigid molded plastic and the conductive interconnecting member may be conductive members with one or more walls extending orthogonally with respect to the plane of alignment of the substrate, i.e., vertically-extending walls as viewed from an installed position of the battery module.

The conductive interconnect member may include first and second strips of the conductive tabs arranged along different edges of the substrate. In such an embodiment, the RF communications circuit and the cell sensing circuit may be mounted to the substrate between the first and second strips such that the RF communications circuit and the cell sensing circuit are flanked by the first and second strips.

In possible embodiments, the RF communications circuit may communicate with the controller using Time Synchronized Channel Hopping. A module cover may span the PCBA and the battery cells. The controller may be positioned remote from the PCBA, i.e., not collocated with the battery module. This is unlike prior art approaches in which the controller is physically mounted to and thus collocated with one of the battery modules. Thus, the RF capabilities enabled by the present disclosure allow for design flexibility and alternative placement of the controller within a vehicle or other top-level system using the battery module.

A battery system is also disclosed that includes a master battery controller and a battery pack having a plurality of the battery modules described above.

Additionally, a vehicle includes the battery system as noted above and an electric machine operable for generating output torque for propelling the vehicle. The battery pack of the system is electrically connected to and driven by the electric machine.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

DETAILED DESCRIPTION

Figure 1:
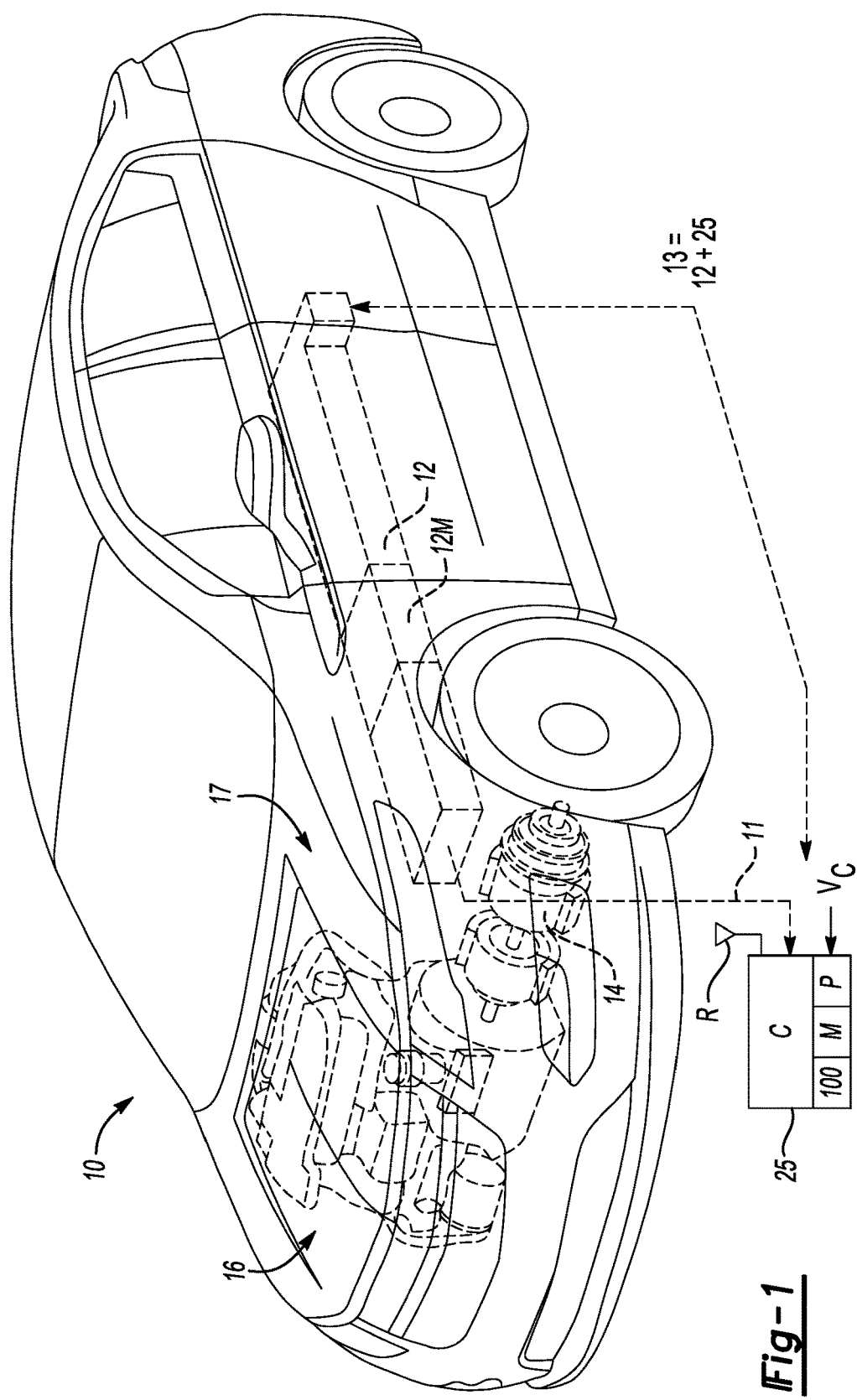
FIG. 1 is a schematic illustration of a system having a rechargeable battery pack with a battery module that includes an integrated wireless printed circuit board assembly (PCBA) as described herein.

Referring to the drawings, wherein like reference numerals are used to identify like or identical components in the various views, FIG. 1 schematically illustrates a system 10 having a battery pack 12 and a controller (C) 25, with the battery pack 12 and the controller 25 forming a battery system 13. The controller 25 includes memory (M) that is programmed with computer-executable logic 100 for controlling overall operations of the battery pack 12. As described below with particular reference to FIGS. 2 and 3, the battery pack 12 includes a plurality of battery modules 12M, and is configured in such a way that all cell sensing, module-to-module, and module-to-controller communication functionality is integrated directly into the structure of the battery modules 12M and performed wirelessly as described below. The disclosed configuration therefore does away with the use of separate hard-wired electronic modules and serial connectors as is the current state of the art. As a result, the present approach may enable reduced cost, mass, and packaging size.

The battery pack 12 may be embodied as a rechargeable energy storage system having a plurality of individual battery cells 30 (see FIG. 3) arranged in a given battery module 12M. The battery pack 12 may be a relatively high-voltage DC energy storage device having any number of battery cells 30 or battery modules 12M. In some applications, as few as two battery modules 12M may be used, with the actual number being dependent on the amount of power that is required. For instance, 192 or more individual lithium ion battery cells 30 may be used in an example embodiment, with the battery cells 30 being collectively capable of outputting at least 18-60 kWh of power depending on the configuration. While a vehicle is shown in FIG. 1 as an example embodiment of the system 10, in this instance a torque-generating system 10, non-vehicular applications such as static power plants may be envisioned, as well as non-automotive vehicle applications such as boats, trains, airplanes, robots, and other mobile platforms. For illustrative consistency, the system 10 of FIG. 1 will be described hereinafter as a vehicle 10 without limiting applications to the vehicle 10.

The vehicle 10 may include a powertrain 17, for instance a hybrid electric powertrain as shown, a battery electric powertrain, or other electrified powertrain. The powertrain 17 may include one or more electric machines 14 and an optional internal combustion engine 16, with the electric machine 14 drawing electrical power from or delivering electrical power to the battery pack 12 as needed. Each battery module 12M individually determines a respective cell voltage (arrow $V_C$) for each battery cell 30 housed within the battery module 12M, and also transmits the cell voltages (arrow $V_C$) wirelessly to the controller 25 over a secure radio frequency (RF) network, e.g., a 2.4 GHz RF range. The controller 25 may therefore be remotely positioned with respect to the battery modules 12M, such as at least about 0.1 meters (m) or at least 0.5 m away from the battery modules 12M, unlike prior art configurations which mount the controller 25 directly to a surface of the battery module 12M.

The controller 25 of FIG. 1 may be embodied as a master battery controller, for instance a Battery System Manager (BSM), and may include one or more computer devices, each one having one or more processors (P) and sufficient amounts of memory (M), e.g., read only memory, random access memory, and electrically-erasable programmable read only memory. The controller 25 may include a receiver (R) configured to receive wireless signals (arrow 11) from the battery pack 12, including cell voltages (arrow $V_C$), and may also be configured to run/execute various software programs in the overall control of the battery pack 12 so as to execute a control action with respect to the battery pack 12 using the cell voltages (arrow $V_C$).

Example software programs, which lie outside of the scope of the present disclosure, may include cell charge balancing, health monitoring, electric range estimation, and/or powertrain control. As part of such programs, the controller 25 may receive other signals not described herein, e.g., temperature and charging/discharging current.

Figure 2:
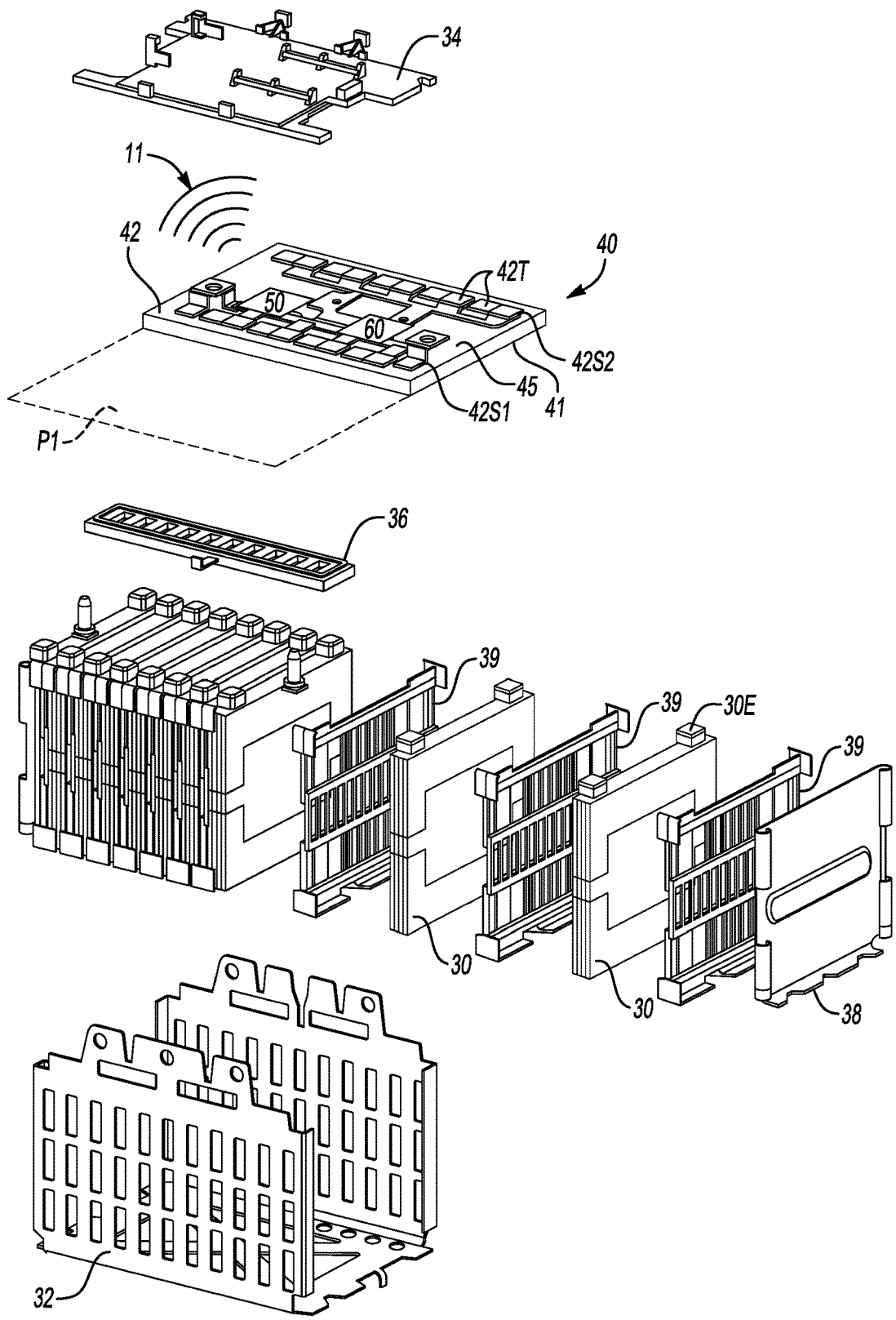
FIG. 2 is a schematic exploded perspective view illustration of an example battery module usable with the battery pack shown in FIG. 1.
Figure 3:
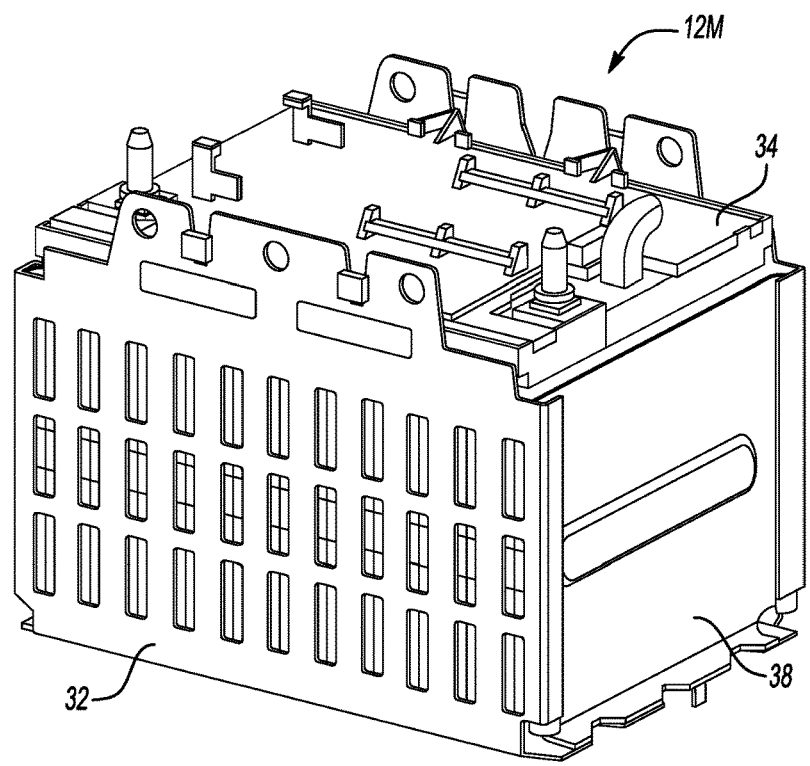
FIGS. 3 and 4 are schematic perspective view illustrations of battery modules usable as part of the system of FIG. 1.

FIGS. 2 and 3 respectively depict assembled and exploded view schematic diagrams of the battery module 12M of the battery pack 12 of FIG. 1. A predetermined number of the battery cells 30 are stacked or otherwise positioned adjacent to each other within an outer cage 32 and secured via a pair of end plates 38 such that electrode tabs 30E of the various battery cells 30 are oriented in a desired direction, e.g., serially aligned as shown. Rigid or compliant cooling frames 39 may be interposed between the battery cells 30 to provide the required cooling function, e.g., via circulated coolant (not shown). A vent seal 36 may be positioned adjacent to the battery cells 30 to facilitate removal of any vapors or gasses produced as a product of operation of the battery pack 12. A printed circuit board assembly (PCBA) 40 that integrates cell sensing and communication functions with electrical connection structure is then positioned adjacent to the battery cells 30 and covered with a module cover 34 may span the PCBA 40 and the battery cells 30 to form the assembled battery module 12M shown in FIG. 2.

With respect to the PCBA 40, this structure may be mounted to the battery cells 30 and includes a substrate 41, a radio frequency (RF) communications circuit 50, and a cell sensing circuit 60, with the RF communications circuit 50 and the cell sensing circuit 60 each connected to the substrate 41, e.g., surface mounted to a surface 45 of the substrate 41. The cell sensing circuit 60 is electrically connected to the RF communications circuit 50 through the substrate 41, such as through traces provided thereon and/or therethrough as is well known in the art. The cell sensing circuit 60 is operable for measuring or otherwise determining a respective cell voltage (arrow $V_C$) of each of the battery cells 30 as noted above. The cell voltages (arrow $V_C$) communicated to the RF communications circuit 50 via the substrate 41 are then wirelessly broadcast or transmitted to the controller 25 of FIG. 1 as the wireless signals 11.

Figure 5:
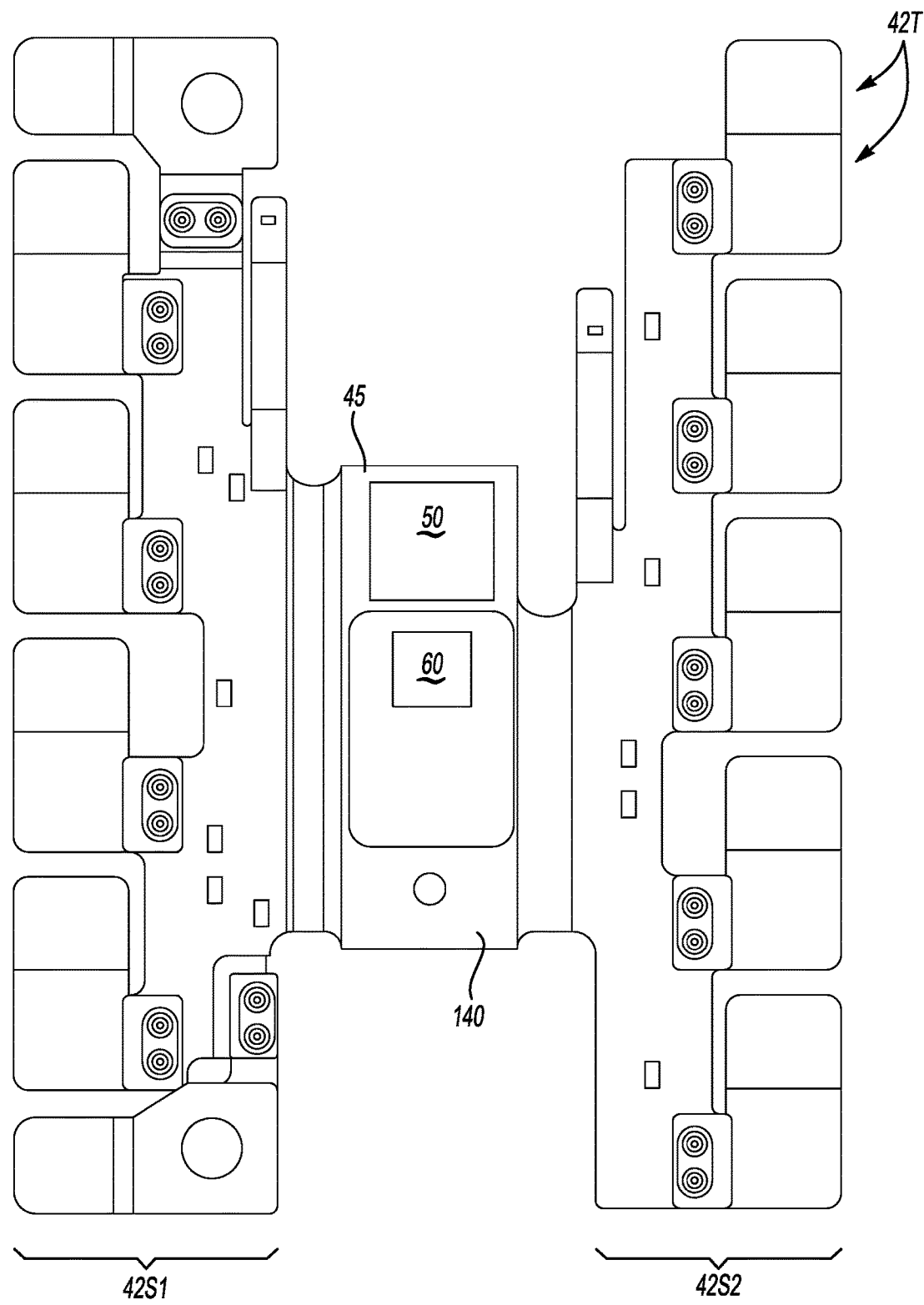
FIG. 5 is a schematic plan view illustration of an embodiment of the PCBA.

The PCBA 40 may also include an electrically-conductive interconnect member 42. Although used in the singular, the conductive interconnect member 42 may include any structure used to form a serial electrical connection between the battery cells 30 within the battery module 12M. For instance, the substrate 41 may be embodied as a flex circuit that is shown in more detail in FIG. 5, i.e., a thin, flexible piece of circuit board having a plurality of relatively flat conductive tabs 42T oriented along a plane that is parallel to a plane of orientation (P1) of the substrate 41, e.g., alternating pads or squares of different conductive material such as copper and aluminum. The conductive interconnect member 42 may include first and second parallel strips 42S1, 42S2 of conductive tabs 42T arranged along different edges of the substrate 41. The RF communications circuit 50 and the cell sensing circuit 60 are mounted to the substrate 41 between the respective first and second strips 42S1 and 42S2. Such structure may be suitable for completing an electrical circuit between the stacked battery cells 30 in the embodiment shown in FIG. 2. As shown in FIG. 5, the substrate 40 may be embodied as a flexible substrate 140.

Figure 4:
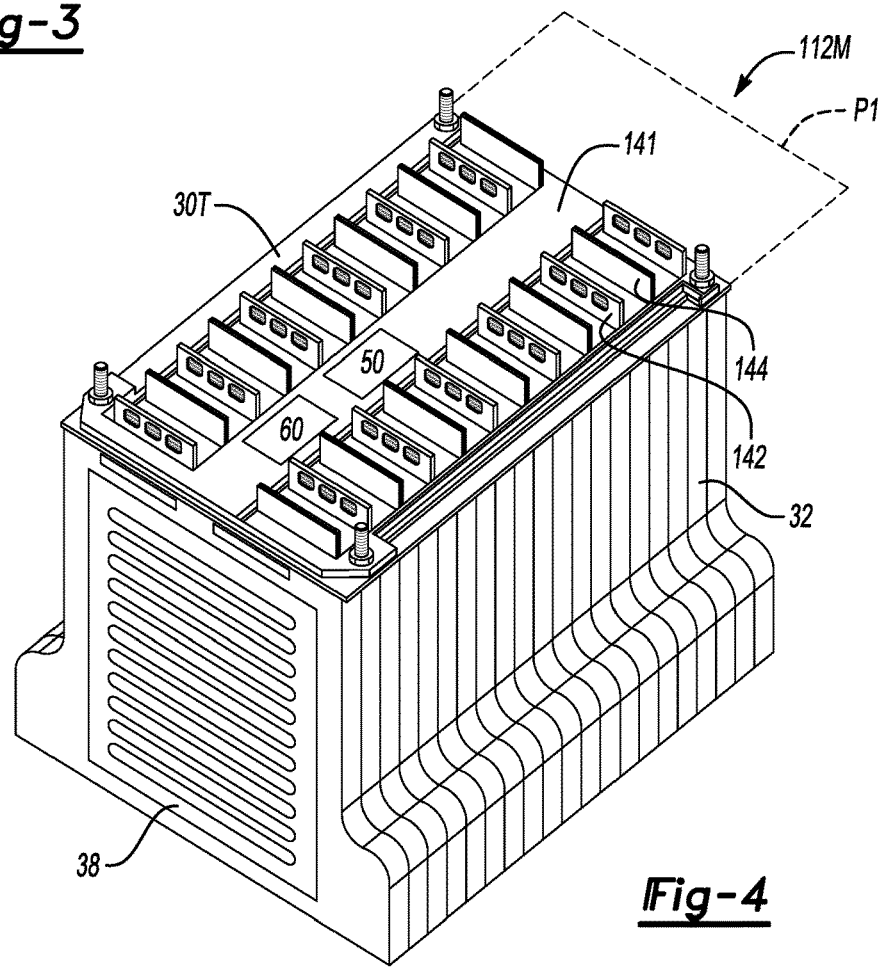

Referring briefly to FIG. 4, other embodiments are possible, such as battery module 112M with foil pouch cells having conductive tabs 30T that extend in vertical direction, e.g., orthogonally with respect to the plane P1 of another substrate 141. In such an embodiment, the interconnect member 42 described above may be replaced with suitable structure, e.g., flat, J-shaped, or U-shaped interconnecting members 142, which may be constructed of copper and/or aluminum or other suitably conductive materials, with the conductive tabs 30T extending orthogonally with respect to the plane P1 and ultrasonically welded to walls 144 of the interconnect member 42 as is known in the art. The substrate 41 in this particular instance may be constructed of molded plastic or another rigid material.

Referring again to FIG. 2, the RF communications circuit 50 and the cell sensing circuit 60 are directly integrated into the battery module 12M. The controller 25 communicates wirelessly with each of the cell sensing circuits 60 of the battery pack 12 via a secured wireless network using the RF communications circuits 50. The controller 25 may be programmed to execute application-specific software to control operation of the battery pack 12, e.g., sleep scheduling, wakeup control, health monitoring, and the like.

In an embodiment, the RF communications circuit may employ 2.4 GHz protocol over a secure wireless network such that data is transmitted using low-power radio waves. As is known in the art, 2.4 GHz protocol generally encompasses a frequency range of about 2.402-2.480 GHz. Other RF frequency ranges may be used within the scope of the present disclosure. The RF communications circuit 50 may communicate with the controller 25 using Time Synchronized Channel Hopping (TCSH), and may follow the IEEE 802.15.4e Standard for Local and Metropolitan Area Networks or other suitable standards. For instance, the RF communications circuit 60 may use, in a non-limiting example embodiment, a wireless mote-on-chip and each of the cell sensing circuits 60 may include a multi-channel, multi-cell sensing chip or any other suitably configured integrated circuit or chip set. TSCH, as is known in the art, is a type of mesh network that synchronizes based on time. Such a network is organized in multiple time slots in which each node in the network is organized with an exchanged time offset. The network monitors the health of the communication and can also change the frequency band in which communication occurs over available channels, e.g., the fifteen available channels within the IEEE 802.15.4 standard.

As will be readily appreciated by those having ordinary skill in the art in view of the present disclosure, a method of controlling the battery pack 12 of FIG. 1 may include forming an electrical serial connection between the battery cells 30 using the conductive interconnecting member, which again is an integral part of the PCBA 40. The method may also include measuring, via the cell sensing circuit 60, a respective cell voltage (arrow $V_C$) of each of the battery cells 30 in the battery module 12M. After the cell voltages (arrow $V_C$) have been determined, the method includes using the RF communications circuit 50 to wirelessly report the various cell voltages (arrow $V_C$) to the controller 25. The controller 25 thereafter executes a control action with respect to an operation of the battery pack 12.

One of ordinary skill in the art will also appreciate that the concepts disclosed herein may be applied to other beneficial uses. For instance, an existing interconnect board may retain all of its existing conventional electrical connectors. The PCBA 40 disclosed above may be electrically connected with such an interconnect board to enable wireless interfacing with one or more battery packs 12 or battery modules 12M without requiring decoding of hundreds of different cell channels. Such an approach may be used to provide multiple battery modules 12M or battery packs 12 as secondary energy storages systems, such as residential, wind farms, solar farms, utility energy storage, etc. Similarly, used battery modules 12M or battery packs 12 having substantial remaining useful life but no longer suitable for powertrain/propulsion applications can be repurposed. Multiple such battery modules 12M or battery packs 12 may be packaged together within a housing (not shown), e.g., a weatherproof protective outer box, and wirelessly interfaced together and with the controller 25 using the PCBAs 40 on each battery pack 12.

As used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

While the best modes for carrying out the disclosure have been described in detail, those familiar with the art to which this disclosure relates will recognize various alternative designs and embodiments lying within the scope of the appended claims. It is intended that all matter contained in the above description and/or shown in the accompanying drawings shall be interpreted as illustrative only and not as limiting.

The invention claimed is:

1. A battery module for use with a controller, the battery module comprising:
   a plurality of battery cells; and
   a printed circuit board assembly (PCBA) mounted with respect to the battery cells, and having:
      a substrate defining a conductive interconnect member having a plurality of conductive tabs, wherein the plurality of conductive tabs are oriented parallel to a plane of orientation of the substrate and form a serial electrical connection between the battery cells within the battery module;
      a radio frequency (RF) communications circuit connected to a surface of the substrate; and a cell sensing circuit connected to the surface of the substrate, and to the RF communications circuit via the substrate, wherein the cell sensing circuit is operable for determining a respective cell voltage of each of the battery cells;

wherein the RF communications circuit is in wireless communication with the controller and is operable for wirelessly transmitting the determined cell voltages to the controller.

2. The battery module of claim 1, wherein the RF communications circuit is in wireless communication with the controller via a 2.4 GHz protocol.

3. The battery module of claim 1, wherein the substrate is constructed of molded plastic.

4. The battery module of claim 1, wherein the plurality of conductive tabs includes first and second strips of conductive tabs in the form of alternating pads or squares of different conductive materials arranged along different edges of the substrate, and wherein the RF communications circuit and the cell sensing circuit are both mounted to the surface of the substrate between the first and second strips of conductive tabs.

5. The battery module of claim 1, wherein the RF communications circuit communicates with the controller using Time Synchronized Channel Hopping.

6. The battery module of claim 1, further comprising a module cover spanning the PCBA and the plurality of battery cells.

7. The battery module of claim 6, wherein the controller is positioned at least 0.1 m from the module cover.

8. A battery system comprising:
a master battery controller; and
a battery pack having a plurality of battery modules each including:
  a plurality of battery cells; and
  a printed circuit board assembly (PCBA) mounted with respect to the plurality of battery cells and having:
    a substrate defining a conductive interconnect member having a plurality of conductive tabs, wherein the plurality of conductive tabs are oriented parallel to a plane of orientation of the substrate and form a serial electrical connection between the battery cells within the battery module;
    a radio frequency (RF) communications circuit connected to a surface of the substrate; and
    a cell sensing circuit connected to the surface of the substrate, and to the RF communications circuit through the substrate, wherein the cell sensing circuit is operable for determining a respective cell voltage of each of the battery cells;
  wherein the RF communications circuit is in wireless communication with the master battery controller and is operable for wirelessly transmitting the cell voltages to the master battery controller, and wherein the master battery controller is programmed to execute a control action with respect to the battery pack using the cell voltages.

9. The battery system of claim 8, wherein the master battery controller is positioned at least about 0.1 m away from the battery modules.

10. The battery system of claim 8, wherein the RF communications circuit is in wireless communication with the master battery controller via a 2.4 GHz protocol.

11. The battery system of claim 8, wherein the conductive interconnect member includes first and second strips of conductive tabs in the form of alternating pads or squares of different conductive materials arranged along different edges of the substrate, and the RF communications circuit and the cell sensing circuit are both mounted to the surface of the substrate between the first and second strips.

12. The battery system of claim 8, wherein the RF communications circuit communicates with the controller using Time Synchronized Channel Hopping.

13. The battery system of claim 8, further comprising a module cover spanning the PCBA and the plurality of battery cells.

14. A vehicle comprising:
an electric machine operable for generating output torque for propelling the vehicle; and
a battery system electrically connected to the electric machine, and having:
  a master battery controller; and
  a battery pack having a plurality of battery modules, with each battery module including:
    a plurality of battery cells; and
    a printed circuit board assembly (PCBA) mounted to the plurality of battery cells, the PCBA including:
      a substrate defining a conductive interconnect member having a plurality of conductive tabs, wherein the plurality of conductive tabs are oriented parallel to a plane of orientation of the substrate and form a serial electrical connection between the battery cells within the battery module;
      a radio frequency (RF) communications circuit connected to a surface of the substrate; and
      a cell sensing circuit connected to the surface of the substrate, and to the RF communications circuit through the substrate, wherein the cell sensing circuit is operable for measuring a respective cell voltage of each of the battery cells;
  wherein the RF communications circuit is in wireless communication with the master battery controller and is operable for wirelessly transmitting the measured cell voltages to the master battery controller, and the controller is programmed to execute a control action with respect to the vehicle using the measured cell voltages.

15. The vehicle of claim 14, wherein the substrate has a plurality of conductive tabs oriented parallel to the plane of orientation of the substrate, and wherein the conductive interconnect member includes the conductive tabs.

16. The vehicle of claim 14, wherein the conductive interconnect member includes first and second strips of conductive tabs arranged along different edges of the substrate, and the RF communications circuit and the cell sensing circuit are both mounted to the surface of the substrate between the first and second strips.

17. The vehicle of claim 14, wherein the RF communications circuit communicates with the controller using Time Synchronized Channel Hopping.

18. The vehicle of claim 14, further comprising a module cover spanning the PCBA and the plurality of battery cells.

19. The vehicle of claim 14, wherein the RF communications circuit is in wireless communication with the master battery controller via a 2.4 GHz protocol.

* * * * *